United States Patent [19]
Gould et al.

[11] Patent Number: 5,514,241
[45] Date of Patent: May 7, 1996

[54] METHOD OF MAKING A PUNCTURE AND CUT RESISTANT MATERIAL

[76] Inventors: Arnold S. Gould, 46 Wildwood Dr., Bedford, Mass. 01730; Larry D. Nichols, 134 Gray St., Arlington, Mass. 02174

[21] Appl. No.: 395,107

[22] Filed: Feb. 27, 1995

Related U.S. Application Data

[62] Division of Ser. No. 3,312, Jan. 12, 1993, Pat. No. 5,407,612, which is a division of Ser. No. 744,284, Aug. 13, 1991, Pat. No. 5,200,263.

[51] Int. Cl.[6] .............................. A41D 19/00; F41H 5/04; B32B 31/18
[52] U.S. Cl. ................. 156/261; 156/267; 156/344; 29/432.1; 29/432.2; 2/2.5; 2/161.7; 89/36.02; 89/36.05; 428/911; 264/153
[58] Field of Search .................... 156/261, 267, 156/247, 344; 29/432, 432.1, 432.2, 17.2, 469.5, 163.6; 2/2.5, 161.7; 89/36.02, 36.05; 264/153; 428/911

[56] References Cited

U.S. PATENT DOCUMENTS

| | | | |
|---|---|---|---|
| 1,372,947 | 3/1921 | Gerritson | 156/261 X |
| 2,723,214 | 11/1955 | Meyer | 2/2.5 X |
| 3,563,836 | 2/1971 | Dunbar | 89/36.02 X |
| 3,684,631 | 8/1972 | Dunbar | 89/36.02 X |
| 3,813,281 | 5/1974 | Burgess et al. | 428/911 X |
| 4,075,751 | 2/1978 | Tschoop et al. | 29/432.1 |
| 4,805,280 | 2/1989 | Elander et al. | 29/432.2 X |
| 5,368,930 | 11/1994 | Samples | 2/161.7 |

*Primary Examiner*—Jeff H. Aftergut
*Attorney, Agent, or Firm*—Pandiscio & Pandiscio

[57] ABSTRACT

A puncture and cut resistant composite material comprising at least one elastomeric layer containing a plurality of flat platelets oriented substantially parallel to the plane of the elastomeric layer, wherein each of the platelets is a small, thin element substantially impervious to normally encountered puncturing and/or cutting by sharp objects, and wherein the platelets by their mutual overlap substantially cover any surface to which the composite material may be applied. This new composite material is particularly well-suited to the formation of gloves.

4 Claims, 5 Drawing Sheets

METHOD OF MAKING A PUNCTURE AND CUT RESISTANT MATERIAL

This is a division of U.S. application Ser. No.08/003,312 filed Jan. 12, 1993 for "Puncture And cut Resistant Material And Article" now U.S. Pat. No. 5,407,612 which is itself a division of U.S. application Ser. No. 07/744,284, filed Aug. 13, 1991 for Puncture And Cut Resistant Material And Article, now U.S. Pat. No. 5,200,263.

FIELD OF THE INVENTION

The present invention relates generally to puncture and cut resistant materials. More particularly, the invention relates to a puncture and cut resistant composite material suitable for use in protective gloves and other articles.

BACKGROUND OF THE INVENTION

Puncture and cut resistant materials suitable for use in protective articles such as surgical gloves are known in the art. Typically, these materials include coarse weaves of a tough synthetic fiber such as Kevlar (either alone or in combination with other materials), fine meshes of metallic chain mail, or even one piece overlays of rigid materials. It is also known in the art that these materials may be utilized to form an article such as a glove, taken either alone or by attaching them to, or by embedding them between, layers of another material such as latex rubber. Unbroken sheets of rigid materials, however, lack the desired flexibility and elasticity for applications which require dexterity. Consequently, while the puncture and cut resistance of an unbroken sheet of rigid material is usually greater than that of a weave or a chain mail, the use of such unbroken sheets of rigid material is usually limited to the protection of only a selected area such as a portion of a finger between adjacent joints. Weaves and meshes are more flexible, but have been found to provide a less than desirable barrier to puncturing by pointed tools.

The need for an effective flexible puncture and cut resistant material suitable for forming surgical gloves and other protective garments therefore remains strong in the art. In chemical handling, biological manipulation and processing, and in the surgical field, the protection of individuals from lacerations or punctures of the skin is more important than ever before. In the course of their daily duties, medical personnel are frequently required to come in contact with bodily fluids of patients which may carry serious, or even fatal, diseases. The recent outbreak of large numbers of instances of infection by the AIDS, hepatitis, and even some flu viruses (all difficult, or presently impossible, to treat successfully) is indicative of the scope of this need. Similarly, many new chemicals have been introduced or are in development which are highly toxic upon entry into the human body. Further, recent advances in biotechnology have resulted in altered bacteriological strains which are unpredictable with regard to their effect upon humans who come in contact with them. Therefore, there is a clear need for an improved material which will provide a puncture and cut resistant barrier for the protection of individuals from dangerous environments.

Ordinary rubber surgical gloves provide a barrier against fluids while allowing the user to retain dexterity and a large portion of his or her sense of touch without severe discomfort. These factors are all important and desirable, but the gloves provide no barrier against sharp objects. Particularly in the operating room where the surgeon and his or her assisting personnel are required to work quickly with and near sharp surgical instruments such as needles, scalpels, syringes, orthopedic tools, drills and the like, the chance of accidental lacerations and/or punctures is high, and the protection level provided by common surgical rubber gloves is low. Heretofore, the addition of protective barriers to these gloves (either in the form of a reinforcing component incorporated into or onto the rubber glove or in the form of a complementary armored glove worn over or under the rubber glove) has not been totally satisfactory for the reasons alluded to above.

OBJECTS OF THE INVENTION

Accordingly it is an object of this invention to provide a material which is substantially resistant to punctures and cuts and suitable for use in the fabrication of protective garments such as gloves.

It also is an object of the present invention to provide a surgical glove which is capable of substantially stopping punctures and cuts of the sort which are likely to be encountered in the treatment of medical patients in the operating room and elsewhere.

Further, it is an object of the invention to provide a glove which is capable of preventing the passage of bodily fluids therethrough.

Still further, it is an object of the invention to provide a glove which provides a protective barrier for the hand of the user while at the same time allowing the user to comfortably retain dexterity and at least a portion of his or her normal sense of touch.

Still further, it is an object of the present invention to provide a protective material for the manufacture of protective articles at an affordable cost.

It is yet another object of the present invention to provide a puncture and cut resistant material which may be formed either in sheets of various sizes and shapes for later fabrication into protective articles, or in situ in the configuration of a desired protective article.

SUMMARY OF THE INVENTION

These and other objects of the invention are addressed by a novel composite material which comprises at least one elastomeric layer containing a plurality of flat platelets oriented substantially parallel to the plane of the elastomeric layer, wherein each of the platelets is a small, thin element substantially impervious to normally encountered puncturing and/or cutting by sharp objects, and wherein the platelets by their mutual overlap substantially cover any surface to which the composite material may be applied. The substantially parallel platelets may be disposed in a randomly overlapping manner throughout the area and thickness of the composite layer; or the platelets may be disposed in one or more substantially coplanar groups, with the platelets within a given coplanar group being disposed at random, and with multiple substantially coplanar groups being arranged in a laminar fashion so that platelets in different coplanar groups randomly overlap; or the platelets may be disposed in one or more substantially coplanar groups, with the platelets within a given coplanar group being disposed in an orderly pattern, and with multiple substantially coplanar groups being arranged in an orderly laminar fashion so that the platelets of each substantially coplanar group are offset from those of other substantially coplanar groups, so as to form an orderly, three dimensional overlapping pattern; or the platelets may be disposed in one or more substantially coplanar groups, with the platelets within a given coplanar group being disposed in an orderly pattern, and with multiple substantially coplanar groups being arranged in a random laminar fashion so that the platelets of each substantially coplanar group are randomly offset from those of other substantially coplanar groups. It is to be understood that in all embodiments of the invention, the pattern of overlap, whether random or ordered, is such as to substantially cover the plane of the composite material with one or more impervious platelets, and that other components such as inner and outer covering layers may be included with the composite layer so as to increase its utility for particular applications.

In one preferred embodiment, a single elastomeric layer is loaded with randomly disposed, substantially parallel platelets whose combined surface area is about five times the superficial surface area of the filled composite, the platelets by their random overlap then covering more than 99% of the superficial surface area of the composite.

A second preferred embodiment comprises three substantially coplanar groups of platelets, each substantially coplanar group bearing a regular periodic hexagonal lattice of circular platelets, the three groups being disposed in an orderly offset manner in such a way that 100% of the superficial surface area of the composite is covered by platelets.

Together these and other embodiments can provide a versatile new class of cut and puncture resistant materials suitable for a wide range of applications including surgical gloves.

BRIEF DESCRIPTION OF THE DRAWINGS

These and other objects and features of the invention will be more fully disclosed or rendered obvious in the following detailed description of the invention, which is to be read in conjunction with the accompanying drawings wherein like reference numerals refer to like parts and in which.

DETAILED DESCRIPTION OF THE INVENTION

Figure 1:
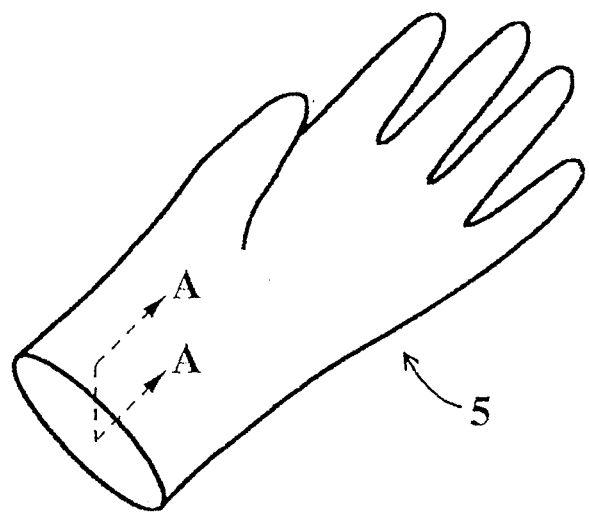
FIG. 1 is a perspective view of a surgical glove made of the material of the present invention wherein the plane upon which the cross-sectional side views of the representative forms of the material depicted in FIGS. 2, 4, 4A, 6, 8, and 8A is shown at A—A.

Referring now to the drawings, and particularly to FIG. 1, there is shown a surgical glove, generally indicated at 5, formed at least in part out of the new composite material of the present invention. The new composite material of the present invention, one embodiment of which is generally representatively shown in FIG. 2 and generally indicated at 10, includes at least one layer 15 of elastomeric material and a dispersion of substantially parallel platelets 25 embedded within the at least one layer 15 of elastomeric material. Platelets 25 are disposed within the at least one layer of elastomeric material 15 so that the platelets reside substantially parallel to one another and to the plane of the elastomeric material. As will be discussed in more detail below, it is preferred that substantially the entire surface area defined by the at least one elastomeric layer 15 be backed internally by platelets 25. Stated another way, it is preferred that the platelets be arranged such that substantially the complete surface area of the body part to be protected is covered by one or more of the platelets.

Figure 3:
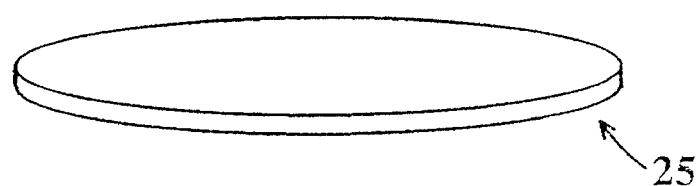
FIG. 3 is an enlarged perspective view of a platelet suitable for use in the present invention.

The platelets 25, best seen in FIG. 3, are very thin disks or wafers of a hard and strong material which is preferably not brittle. It has been found that the platelets 25 may be as thin as 0.0015 inches or less depending upon the application at hand and the material chosen. In this respect, it is to be appreciated that the thickness and material chosen must be such that the platelet 25 is substantially impervious to puncture or cutting by forces normally applied by hand by a sharp or pointed object to the body part which is to be protected by an article formed of the composite material. Materials such as carbon steel, stainless steel, hard non-ferrous metals, titanium alloys and the like are suitable. Cold rolled, 301 stainless steel, full hard, 0.002 inches thick, or hardened and tempered carbon steels, are preferred for composite materials suitable for surgical gloves.

The platelets 25 may have substantially any geometric shape desired, including but not limited to circular, oval, and regular or irregular polygonal shapes with rounded corners. Burrs, sharp corners and bending of the platelets 25 are to be avoided. Burrs and sharp corners can cause internal cutting of the elastomeric layer carrying the platelets as the composite material is manipulated during use. Also, burrs and bending (i.e., the divergence of a platelet from a purely planar geometry) can undesirably increase the thickness of the final composite material and thereby detract from its utility in some contexts of use.

The size and shape of the platelets 25 may vary from article to article, depending on the application at hand. The size and shape of each of the platelets 25 also need not be the same throughout the entire article being formed; they may vary in size and shape depending on their location in the article being formed. In this respect, and as will hereinafter be discussed in greater detail below, it has been found that the smaller the platelets 25 are, the better they will conform to curved surfaces, but the worse they will perform as a barrier to the passage of a pointed object through the material. Conversely, the larger the platelets 25 are, the better they will be in stopping the penetration of the material by a pointed object, but the worse they will be in conforming to a curved surface. Furthermore, larger platelets 25 tend to reduce the tactile feedback provided to an individual wearing an article formed of the composite material, and to cause problems with elastomer tearing, particularly in the removal of articles of the material formed in situ from an associated mold, e.g. a glove mold of the sort hereinafter described. Thus, the precise size and shape of platelets 25 may vary from article to article, and the size and shape of the platelets 25 may even vary within a particular article, depending on the particular application involved. Stated another way, each context of use will affect particular parameters desired for the composite material and therefore the materials chosen to form the composite. It has been found, for example, that the platelets 25 may have a circular shape and a diameter of between about 1.5 mm and about 4.0 mm for a surgical glove.

Platelets 25 are distributed within the one or more elastomeric layers 15 so that the platelets are disposed substantially parallel to one another, and substantially parallel to the plane of the elastomeric layer. The substantially parallel platelets 25 may be distributed in the at least one elastomeric layer 15 so that they are highly ordered, partially ordered, or randomly dispersed. The more ordered the distribution of platelets 25, the thinner the composite 10 can be and still be substantially gap free.

More particularly, the substantially parallel platelets 25 may be disposed in a randomly overlapping manner throughout the area and thickness of the composite layer; or the platelets 25 may be disposed in one or more substantially coplanar groups, with the platelets within a given coplanar group being disposed at random, and with multiple substantially coplanar groups being arranged in a laminar fashion so that platelets in different coplanar groups randomly overlap; or the platelets may be disposed in one or more substantially coplanar groups, with the platelets within a given coplanar group being disposed in an orderly pattern, and with multiple substantially coplanar groups being arranged in an orderly laminar fashion so that the platelets of each substantially coplanar group are offset from those of other substantially coplanar groups so as to form an orderly, three dimensional overlapping pattern; or the platelets may be disposed in one or more substantially coplanar groups, with the platelets within a given coplanar group being disposed in an orderly pattern, and with multiple substantially coplanar groups being arranged in a random laminar fashion so that the platelets of each substantially coplanar group are randomly offset from those of other substantially coplanar groups.

Figure 2:
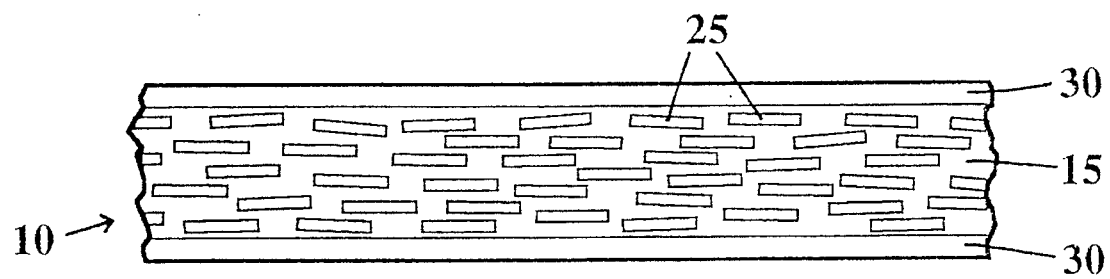
FIG. 2 is a partial cross-sectional side view of one form of the new material of the present invention.

Thus, for example, FIG. 2 illustrates a composite material 10 wherein the substantially parallel platelets 25 are disposed in randomly overlapping manner through the area and thickness of the composite layer. By way of example, such a composite material may be formed through a single or multiple pass dipping process of the sort which will hereinafter be discussed in further detail. Where the platelets 25 are randomly disposed through the area and thickness of the composite layer, i.e., as in FIG. 2, Poisson statistical analysis predicts that if substantially parallel platelets are dispersed entirely at random, and their combined surface area would cover the entire composite surface n times, then the fraction of the entire area accidentally left uncovered will be about $e^{-n}$. Moreover, if the method of manufacture will not allow more than some maximum number of disks to overlap at any one point, the fraction of area accidentally left uncovered can be substantially less than $e^{-n}$. For example, a totally random distribution of substantially parallel platelets 25 whose combined area is 5 times the superficial area of the composite will cover about 99.33% of the entire surface, while a random distribution of the same platelets will cover about 99.90% of the surface if no more than 10 disks vertically overlap at any one point. Such an improvement in coverage results from the fact that the high stacks which occasionally occur in a purely random distribution poorly utilize disks which would cover more area if distributed more evenly.

Figure 4:
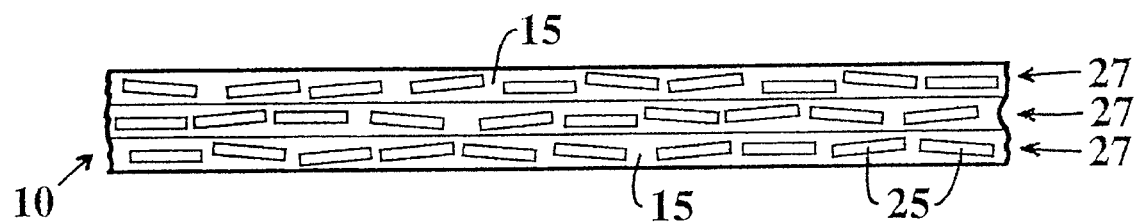
FIG. 4 is a partial cross-sectional side view of another form of the new material of the present invention.
Figure 4A:
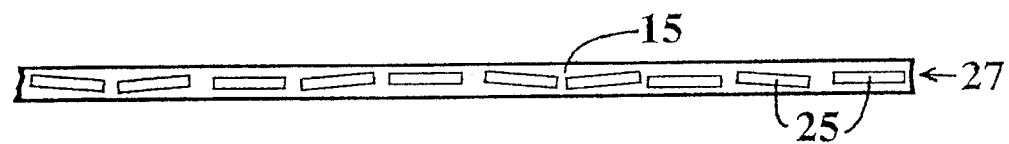
FIG. 4A is a partial cross-sectional side view of a portion of composite material which can be used to fabricate the composite material shown in FIG. 4.

FIG. 4 illustrates a composite material 10 wherein the substantially parallel platelets 25 are disposed in one or more substantially coplanar groups 27, with the platelets within a given coplanar group 27 being disposed at random, and with the multiple substantially coplanar groups 27 being arranged in a laminar fashion so that the platelets in different coplanar groups randomly overlap. By way of example, such a composite material my be formed by laminating together two or more layers of the sort shown in FIG. 4A. In such a situation, inasmuch as the platelets 25 are disposed in the elastomer 15 of FIG. 4A with a coplanar but otherwise random configuration, it would typically not be possible to register one layer relative to another during lamination.

Figure 5:
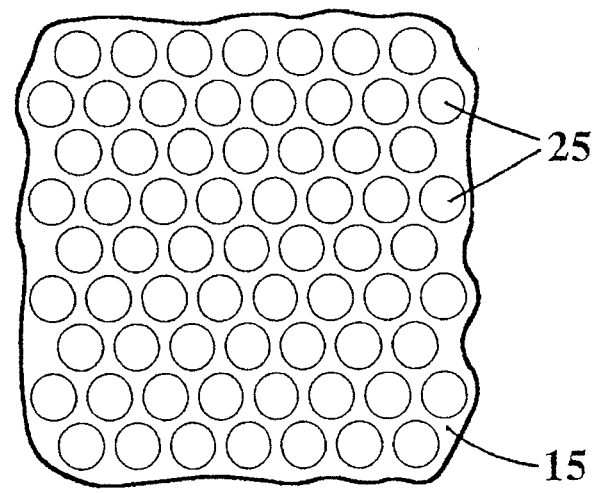
FIG. 5 is top elevational view of one substantially coplanar group of platelets disposed in elastomeric material.
Figure 6:
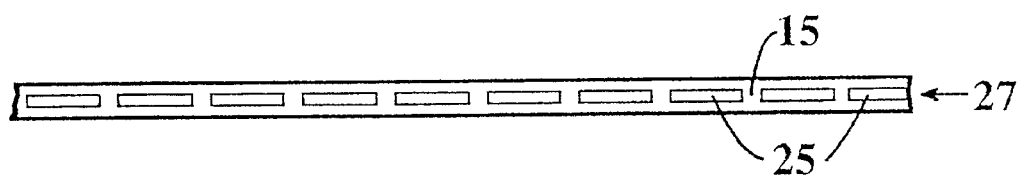
FIG. 6 is a partial cross-sectional side view of the material shown in FIG. 5.
Figure 7:
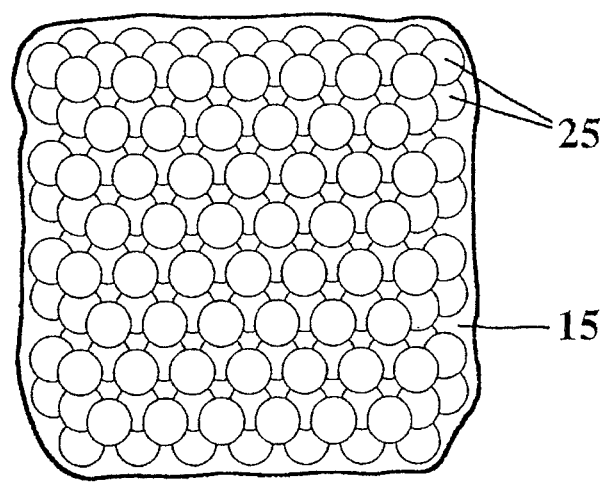
FIG. 7 is a diagramatic top opaque view showing a laminar configuration of three superimposed substantially coplanar groups of platelets, wherein each substantially coplanar group of platelets is similar to the configuration depicted in FIGS. 5 and 6.
Figure 8:
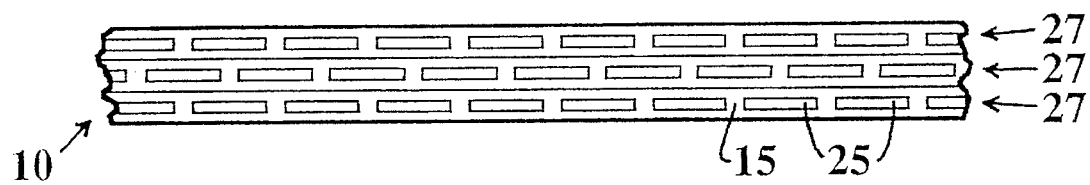
FIG. 8 is a partial cross-sectional side view of the composite material shown in FIG. 7.

FIGS. 5–8 illustrate a composite material 10 wherein the substantially parallel platelets 25 are disposed in one or more substantially coplanar groups 27, with the platelets within a given coplanar group being disposed in an orderly pattern, and with multiple substantially coplanar groups being arranged in an orderly laminar fashion so that the platelets of each substantially coplanar group are offset from those of other substantially coplanar groups, so as to form an orderly three dimensional overlapping pattern. More specifically, FIGS. 5 and 6 illustrate an elastomeric layer 15 bearing a highly ordered distribution of platelets 25 disposed in a single coplanar group 27. FIGS. 7 and 8 illustrate how superimposing three highly ordered coplanar groups 27 (e.g. by laminating together three composite layers of the sort shown in FIGS. 5 and 6) can result in substantially complete coverage of the body area to be protected by the platelets contained in the composite material.

Figure 8A:
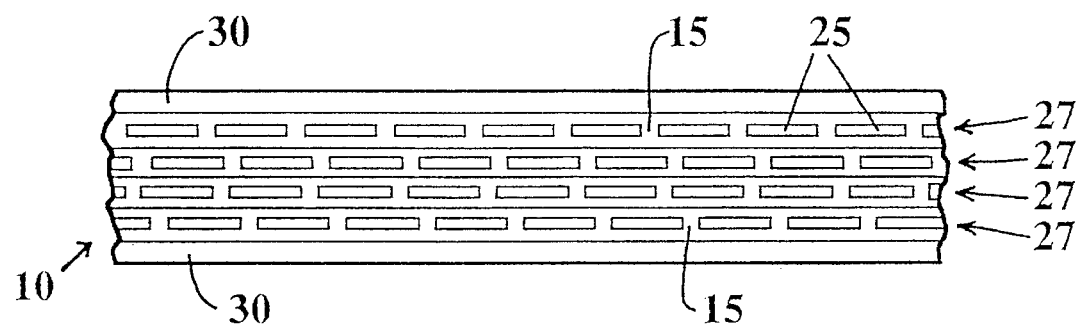
FIG. 8A is a partial cross-sectional side view of another form of the new material of the present invention.

Of course, it is also anticipated that one might laminate together two or more layers of the sort shown in FIGS. 5 and 6 with a random registration relative to one another so as to achieve a composite material such as that shown in FIG. 8A. In essence, in FIG. 8A the platelets 25 are disposed in substantially coplanar groups 27, with the platelets within a given coplanar group 27 being disposed in an orderly pattern such as that shown in FIGS. 5 and 6, and with multiple substantially coplanar groups 27 being arranged in a random laminar fashion so that the platelets of each substantially coplanar group are randomly offset from those of other substantially coplanar groups.

Preferably, platelets 25 are embedded in an elastomeric layer 15 so that each of the platelets 25 is spaced from adjacent platelets 25 by a region of elastomeric material.

The elastomeric material used to form the layers 15 may be either natural or synthetic rubber. Polyurethane elastomer, nitrile rubber, vinyl rubber, polyisoprene, neoprene, and chloroprene, as well as similar materials, are all deemed to be acceptable alternatives. Similarly, depending on the method used to form the composite material 10, the elastomeric material may take a variety of different forms. By way of example, where the platelets are to be mechanically embedded in a solid sheet of elastomeric material, the elastomeric material may be in a solid form throughout the fabrication process. On the other hand, where the composite material 10 is to be formed through a dipping process, the elastomeric material may be in latex, solution, melt, monomer-polymer mixture, or any other liquid form capable of conversion in situ to a fully dried or cured elastomer. Of course, in this regard it must be appreciated that care must be exercised to avoid negative interactions between the elastomeric material, in solid or liquid form, and the platelets 25. For example, ingredients used in the formulations of natural rubber latex used for dipping tend to interact with carbon steel so that if such a combination of materials were to be used, the carbon steel should be protected from interacting with these ingredients.

It is believed that the best flexibility and elasticity of the composite material will be present in those cases wherein the elastomeric material does not adhere well to the platelets 25, i.e., when the platelets 25 are contained within encapsulating pockets in the elastomer to thereby allow the surrounding material to flex and stretch about the platelets 25 without restriction. This is referred to as "decoupling" in Examples 1–4 which follow and can occur naturally (e.g. cured natural latex does not adhere well to most surfaces), or it can be induced by coatings on platelets 25 that interfere with adhesion of elastomer 15 to platelets 25.

It is also anticipated that one or more elastomeric layers 30 free of platelets 25 may be disposed adjacent to the layers 15 containing platelets 25 (see, for example, FIGS. 2 and 8A, where platelet-free layers 30 have been added to the upper and lower surfaces of the composite material 10).

Depending upon the article being formed, the platelets 25 may be disposed so that they are uniformly distributed about the article, or so that they are variably distributed about the article. By way of example, in the case where a surgical glove is to be formed, the platelets may be disposed only about the finger areas, with the remainder of the glove being devoid of the impervious platelets. Furthermore, in those regions of the article which contain the platelets, the platelets may be uniformly distributed or they may be variably distributed. Thus, in the case of a surgical glove having platelets disposed only about the finger areas, the platelets may have a greater concentration in the fingertip regions than in the remaining finger areas.

It is currently believed that the ability of the composite material to stop the penetration of a sharp edged or pointed object is a function of the impenetrability and size of the individual platelets 25, the average number of platelets layered one on top of the other, the spacing of the platelets one from the other, the orderliness of the platelets in the composite material, and the strength of the elastomeric medium in which the platelets 25 are located.

Figure 9:
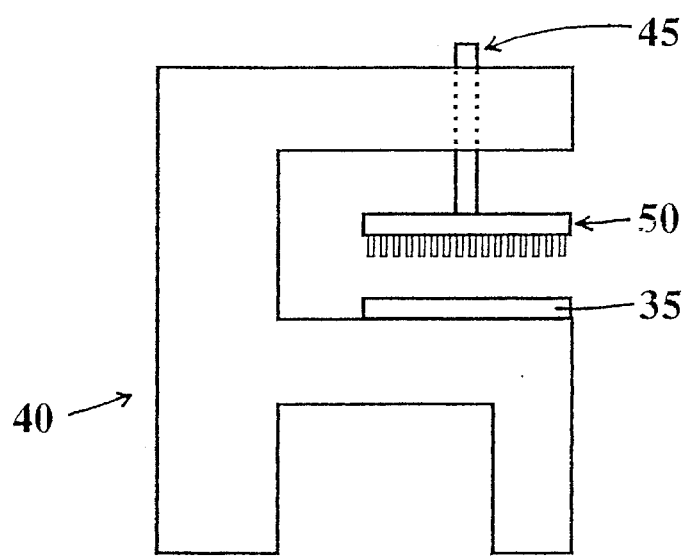
FIG. 9 is a schematic side elevational view of an apparatus for forming the platelets shown in FIG. 3.

The platelets 25 may be formed in various ways. For example, the platelets 25 may be punched out of a sheet of foil 35 by a punch press 40 similar to that shown schematically in FIG. 9. In one alternative, the piston 45 of the press 40 may be fitted with a male punch member 50 adapted to engage a fixed female die member (not shown). Obviously, the male punch member 50 and the female die member may comprise a configuration of punches and dies (not shown) in order to form a plurality of platelets 25 at the same time. A sheet of donor foil 35 is located between the male punch and the female die, and the piston is then activated to punch out one (or more) platelets 25 from the foil. The piston is then retracted and the operation repeated, with the sheet of donor material being advanced or replaced to present a virgin region of the foil. Such a procedure is commonly used in certain industries, i.e., the perforated screen industry. However, there are certain mechanical problems associated with this method. More specifically, the punch and die sets are expensive to manufacture, they wear out fairly quickly, and if tolerances are not maintained to very tight standards, they will fail to operate properly and may yield platelets 25 that deviate from a purely planar geometry. The latter occurrence may unnecessarily increase the thickness of the layers of the composite material. Further, since this process yields loose platelets 25, the handling of the separate platelets 25 made in this manner may be inconvenient and costly in those cases where a particular final platelet configuration or pattern is desired, since the loose platelets 25 must then be arranged in the desired pattern within the elastomeric layer during fabrication of the composite material.

Figure 10:
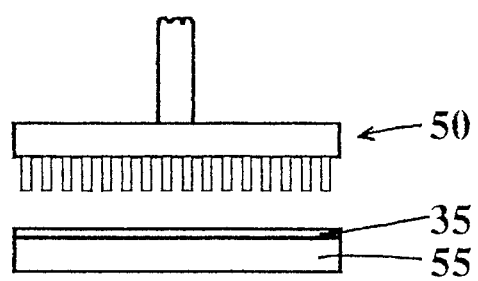
FIG. 10 is a schematic side elevational view of an apparatus for forming the platelet/substrate combination shown in FIGS. 5 and 6.

To overcome these problems, it has been found that the platelets 25 may be formed by utilizing a punch press 40 fitted with only a male punch (or punches) 50 on the piston 45 and with no female die being provided whatsoever; the sheet of donor foil 35 is placed on top of a firm but indentable carrier sheet 55, so that the donor foil resides between the carrier sheet 55 and the punches 50 (see FIG. 10). The carrier sheet 55 then itself resides on top of some solid backing (not shown), e.g. the press bed, which resists any retreat of the carrier sheet and donor foil from the punches 50. The donor foil 35 may be lightly adhered to the carrier sheet 55, or it may simply rest against the upper surface of the carrier sheet. The piston is then activated to drive the punches against the foil so as to punch platelets 25 out of the foil and embed them in the carrier sheet 55. The piston is retracted, the carrier sheet 55 bearing the platelets 25 removed or advanced, the unused portion of the donor foil is discarded, and the process repeated.

If the platelets 25 are to be thereafter utilized in loose form, they may then be dislodged from the sheet 55 by simply running the sheet 55 over an appropriately curved surface (not shown), e.g., a roller, or by some equally effective technique so as to dislodge the platelets 25 from carrier sheet 55.

Alternatively, if the platelets 25 are to be used in an ordered pattern, they may be left embedded in the carrier sheet 55. In the latter situation, so long as the material of the carrier sheet is chosen to be consistent with the elastomeric requirements of the composite material being formed, the platelet-containing carrier sheets 55 may then form the complete composite material being fabricated (in the case where the composite material comprises only one elastomeric layer), or they may be incorporated into the final composite material by lamination (in the case where the composite material comprises multiple elastomeric layers), with the carrier sheet 55 acting as the elastomeric layer 15 of the composite material. In this situation, it may be advantageous to employ a carrier sheet comprised of two layers, with only the thin upper layer becoming part of the final laminate, while the lower layer is discarded or reused. The foregoing technique of forming the impervious platelets 25 at the same time that they are positioned in their elastomeric carrier 55 is particularly useful in those circumstances where one wishes to form a highly ordered configuration of platelets 25 in the elastomeric layer 15, inasmuch as the positioning of the platelets 25 making up a substantially coplanar group 27 in an elastomeric layer 15 can be closely controlled by punch geometry. Thus, this technique enables one to easily fabricate a highly ordered configuration of the sort shown in FIGS. 5 and 6.

It is anticipated that this technique will be used to produce elastomeric layers 15 carrying a single planar configuration 27 of platelets, e.g. one such as that shown in FIGS. 5 and 6. Such layers can then be used singly to form the composite material of this invention, or may be combined with adjacent similar layers to together form the desired composite material, e.g. such as that shown in FIGS. 7 and 8. Since the substantially coplanar configurations 27 of platelets 25 which are formed in this manner can be highly ordered, this process lends itself particularly well to producing composites having properly registered layers of highly ordered configurations, such as that shown in FIGS. 7 and 8. In one preferred form of the invention, three layers such as that shown in FIGS. 5 and 6 are laminated together so as to form a complete composite material such as that shown in FIGS. 7 and 8, whereby the composite material will have its platelets arranged so as to provide substantially complete coverage of the body surface overlaid by the composite material.

It will be appreciated that the material of the present invention may be manufactured either in sheets (to be subsequently assembled into the desired article) or in situ as a molded or dipped article.

To make sheets of the composite material which will substantially completely cover the surface to be protected with platelets, either a single elastomeric layer is formed having a plurality of substantially parallel overlapping platelets, or a plurality of layers each bearing platelets are laminated together. These laminated sheets may then be formed into a desired shape and sealed together to form a desired article such as a glove. Of course, as noted above, different portions of the article may be provided with varying characteristics if desired, such as the back of the glove having fewer platelets, or fewer layers of platelets, than the palm.

Figure 11:
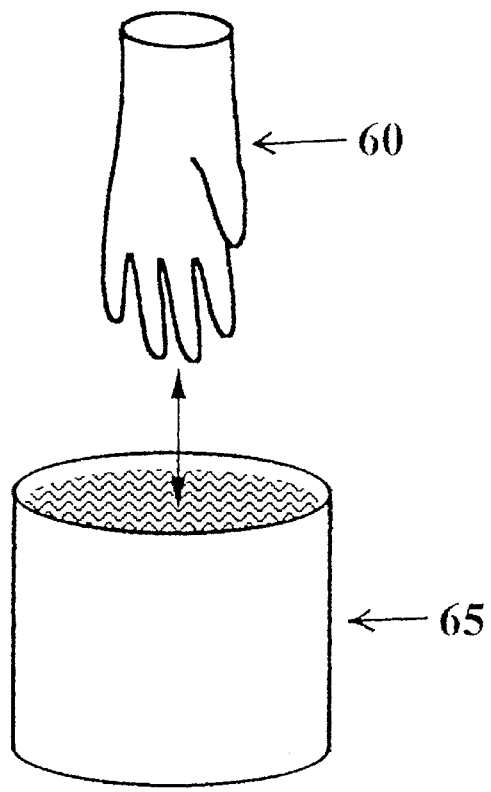
FIG. 11 is a perspective view of a mold and a container containing an elastomer in liquid form having a large quantity of platelets of the type shown in FIG. 3 located in suspension therein.

The alternative of forming the material in situ in the shape of the desired article by dipping can be accomplished in the following manner. A mold form 60 shown in FIG. 11 is provided along with a container 65 for holding a supply of the elastomer in liquid form. A large supply of platelets 25 are held in suspension in the liquid elastomer. The form 60 is dipped into the liquid elastomer in container 65 and thereafter removed, carrying with it a coating of the elastomer and platelets. The surface tension of the liquid remaining on the mold draws the platelets 25 into substantially parallel alignment with the surface of the mold (see Examples 1 and 2 which follow). Since the distribution of the platelets 25 in the elastomer will be random in this alternative, it may be desirable to allow the elastomer to dry or otherwise cure and thereafter repeat the dipping process a number of times in order to assure substantially complete coverage with platelets 25 of the body surface which will be overlaid by the composite material. See FIG. 2. Of course, in the event that inner and/or outer layers 30 (FIG. 2) of platelet-free elastomer are desired, these may be formed by dipping the mold in a container having only elastomer (and not containing platelets 25 in suspension) prior to and/or after the platelet-containing material is dip coated thereon.

Alternatively, the middle layers of an article formed by multiple dipping may be provided with a configuration of randomly disposed, substantially parallel overlapping platelets 25 by dipping the mold into a container having only liquid elastomer and then sifting a quantity of platelets 25 onto the outer surface of the layer before it dries, or by otherwise coating the wet elastomer layer with a configuration of platelets 25, e.g. by inserting the still-wet mold into a fluidized bed of impervious platelets 25, etc.

Another possible alternative, in the case where the platelets 25 are metals capable of being attracted by magnetism, is to make the form either partially or wholly from magnetized materials. By magnetically attracting the platelets 25 to the form before encapsulating them in elastomer via dipping (see Examples 3 and 4 which follow), it has been shown that a glove can be formed which is protected by platelets either wholly, or over only specific areas such as inner portions of the fingers. Additionally, this magnetic forming technique can also be used to allow a larger "processing window" when dipping a form into a slurry of platelets 25 in order to fix the platelets 25 in place on the form as the form is withdrawn from the slurry.

It has been found that in some circumstances a pointed object may strike and then skid along the face of a platelet 25, slip off the edge of that platelet, and then plunge further into the material. This occurrence, which will sometimes hereinafter be referred to as "skating", can sometimes result in the total penetration of the composite material by the point of the impinging object. Obviously such skating is undesirable.

The factors which appear to control the skating phenomenon are (1) the coefficient of friction between the needle point and the surface of the platelet 25; (2) the surface area of the platelets 25; (3) the softness of the elastomeric matrix surrounding the platelets 25; (4) the energy of the needle point entering the composite material; (5) the off-center distance of impact on the platelet 25; and (6) the rigidity of the surface underlying the composite material (i.e., the skin of the palm surface of a human hand is more yielding than the skin surface of the back of a human hand, which has bone substantially immediately beneath it, and consequently, the platelets 25 overlying the palm surface can pivot more easily than the platelets overlying a skin surface reinforced by bone).

Neither the incoming energy of the needle point nor the point of impact are controllable factors with respect to the present invention. Similarly, as mentioned above, the softness of the elastomeric matrix is generally dictated by factors such as the shape of the article being formed from the material, the degree of comfort, dexterity, and tactile feedback required by the article's wearer, and the rigidity of the surface underlying the elastomeric layer. Consequently it has been found that the most practical ways to reduce skating are by either (a) adjusting the coefficient of friction between the needle point and the surface of the platelet 25, by the provision of a tough anti-skate coating on the platelets 25 so as to inhibit lateral travel of the needle, and/or (b) adjusting the surface area (i.e., effective diameter) of the platelets 25 so as to be as large as possible relative to the needle point without excessively limiting the dexterity and sense of touch of the user. Such tough anti-skate coatings can be provided on the platelets by coating them with a variety of different materials, e.g. the platelets can be coated with a layer of polyurethane, or with a layer of epoxy paint, etc.

Figure 12:
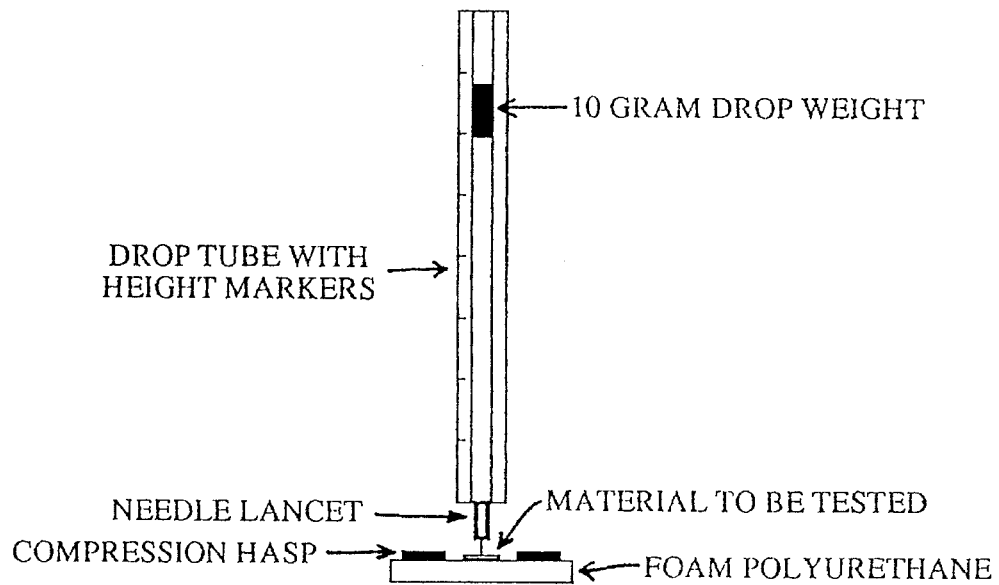
FIG. 12 is a schematic view of a device used to test composite materials formed in accordance with the present invention.

Several examples demonstrating the practicality of the above-described processes for the formation of the composite material of this invention will now be presented. In these examples, the dart drop test referred to is a test developed by the Applicants to determine the resistance of a material to penetration by a sharp object such as a needle. Current ASTM tests involve the use of low speed impacting spheres or high speed impacting darts having dull points against a piece of material. These tests are not considered by the inventors to be truly indicative of the resistance of a material to penetration by a sharp object such as a needle. It has been estimated that the maximum energy of a needle point impact upon a surgical glove during a surgical procedure will be on the order of about 200 gramforce centimeters (gmf-cm). This could occur, for example, during a suturing operation wherein the surgeon's hand momentarily impacts an impediment, stopping its forward motion, and thereafter suddenly slips free and plunges forward. The test developed by Applicants therefore simply mounts a sample of the material on a compressed foam backing beneath a lancet needle resting against its upper surface (see FIG. 12). A ten gram weight is then dropped from various heights to impact the hard plastic mounting of the lancet needle so as to drive it against the outer surface of the test sample. The energy of the impact of the rigid needle against the surface of the material is then calculated by multiplying the weight in grams by the distance of fall in centimeters, and that energy is then correlated with whether or not the needle penetrated through the material.

Examples of the Preparation of Fingers of Puncture-Resistant Glove by Dipping

Dipping of surgical and surgical-type gloves is a common practice, in which a male form usually made of porcelain or metal is dipped into a vat of latex or dissolved elastomer to form a hollow glove. The glove is then either dried or otherwise cured and stripped off the form. This dipping process can be done in one or multiple passes, depending on the system used (latex vs. dissolved elastomer) and depending on the thickness or degree of protection desired. In the case of the puncture-resistant glove of the present invention, individual finger forms were dipped multiple times using different methods which were kept as close as possible to existing industrial practices so as to obtain puncture-resistant yet still dextrous and flexible prototype surgical glove fingers using methods by which complete gloves could be readily manufactured. The examples below incorporate as the flexible glove medium both polyurethane elastomer and natural latex rubber, however those experienced in the art will recognize that the same type of dipping processes could be applied to other elastomeric systems as well.

EXAMPLE 1

Full-hard cold rolled 301 stainless steel (0.002" thick) obtained from Teledyne Rodney Steel Corp., New Bedford, Mass., was first cleaned with acetone and then coated on both sides with a thin (approximately 0.0005" thick) layer of Tecoflex SG 60D polyurethane (Thermedics, Inc. of Woburn, Mass.) for its "anti-skate" properties. This was accomplished by first dissolving the 60D polyurethane in dimethylacetamide (DMAC) at a weight percentage of approximately 10% (note that the 60D polyurethane will not readily dissolve in the methylene chloride used later in this process). The stainless steel was then dipped into the solution and laid horizontally to dry in a fume hood with infra-red lamps directed at the steel.

A coating of Butcher's Wax (The Butcher Polish Co.) was applied heavily and let dry on both sides of the coated metal to incorporate anti-adhering "decoupling" properties to the coated metal. Platelets of 3/32" diameter were then punched out using an array of pin punches and a hammer, with the steel backed by 0.035" thick high density polyethylene.

After approximately 3500 platelets were punched out, they were suspended uniformly in a viscous solution of Tecoflex 80A polyurethane dissolved in methylene chloride (10% by weight) and poured into a narrow glass beaker of approximately 120 cc in volume. Porcelain finger forms from a full hand form normally used for dipping gloves were then dipped sequentially into:

a. A solution of 7.5% by weight of Tecoflex 80A in methylene chloride. The solvent was allowed to air dry from the finger coating.

b. The uniform slurry of pre-coated steel platelets in 10% Tecoflex 80A in methylene chloride. The fingers were heated with infra-red lamps in a hood and allowed to fully dry.

c. The same solution as in a, after which the fingers were allowed to air dry.

The fingers were lightly powdered to avoid self-sticking, and then were rolled off of the forms to produce fingers of approximately 35 mils thickness that were flexible. Dart drop testing using an energy of 200 gmf-cm at ten different locations failed to penetrate the finger.

EXAMPLE 2

Polyurethane coated and waxed platelets were prepared as in Example 1.

These platelets were then suspended uniformly in a solution of approximately 10% by weight of Tecoflex 80A in methylene chloride. Porcelain finger forms were then sequentially processed as follows:

a. The finger form was dipped into a solution of 7.5% by weight of Tecoflex polyurethane 80A dissolved in methylene chloride. The finger coating was allowed to dry fully in air.

b. The palm side only of the finger form was dipped into the slurry of steel platelets in a solution of 10% by weight of Tecoflex 80A polyurethane dissolved in methylene chloride. The finger was first dragged nearly horizontally through the slurry and then drawn in an arc vertically so that the fingertip left the slurry last. In this way the finger form was covered with the layer of platelets on only the palm side of the finger. The finger form was allowed to dry fully in air.

c. The procedure used in (a) above was used to dip the finger form in a 7.5% solution of Tecoflex 80A in methylene chloride to provide an outer coating of pure polyurethane.

The finished finger was lightly powdered and rolled off the form to yield a flexible puncture-resistant yet dextrous glove finger. Dart drop testing using an energy of 200 gmf-cm was performed on the palm side of the finger 10 times with no punctures.

EXAMPLE 3

Hardened and tempered carbon steel of 0.002" thickness (part number 666-2 made by L. S. Starrett for use as feeler gage stock) was cleaned thoroughly with acetone and then coated on both sides with a two-part epoxy paint (Valspar Hi-Build Epoxy 89-T-1 Curing Agent and 89-W-9 Base) as an anti-skate coating. The epoxy was cured thoroughly with a thickness of 0.0005"–0.001" per side. Then a coating of Butcher's Wax (The Butcher Polish Co.) was applied heavily and let dry on both sides of the coated metal to incorporate anti-adhering "decoupling " properties to the metal. Flat platelets were punched out of the metal using a hammer and a multiple ³⁄₃₂" pin punch against 1.035" thick high density polyethylene plastic backing to form approximately 2500 platelets. These platelets, epoxy coated (for anti-skating) and wax coated (for decoupling properties) were then gathered in a mound extending in a straight line.

A porcelain finger form was modified to accept a flexible magnetic strip (Magnasheet trademark) on the inside surface of the finger. The flexible strip was kept in place by its own adhesive-backed surface and then further smoothed by an oversleeve of a thin rubber glove. The rubber was then further oversleeved with a very thin polyethylene glove finger that was placed on the rubber sleeve to protect the rubber sleeve from solvent damage.

The entire finger form was then dipped in a 7.5% by weight mixture of 80A Tecoflex polyurethane (made by Thermedics, Inc.) dissolved in methylene chloride, and allowed to air dry. The dry coated finger form was then brought close to the linear mound of ³⁄₃₂" diameter platelets until even and full coverage of platelets on the inner magnetic surface of the form was achieved. The form was then slowly dipped in a 0.6% solution of 80A Tecoflex polyurethane dissolved in methylene chloride to tack down the platelets and allow trapped air bubbles to escape. The form was then removed vertically and allowed to air dry. Finally the form was dipped again in the 7.5% solution of 80A polyurethane in methylene chloride and allowed to air dry.

The composite finger was lightly dusted with powder and then removed from the form. The resulting finger was flexible, sensitive to touch and approximately 0.035" thick along its armored inner strip. Its back and side surfaces of disk-free polyurethane were approximately 0.013" thick. Dart drop testing using an energy of 200 gmf-cm was performed on the inner armored strip section 10 times with no punctures.

EXAMPLE 4

Hardened and tempered carbon steel made by L. S. Starrett for feeler gage stock (number 666-2) of 0.002" thickness was cleaned thoroughly with acetone and then coated with a two part epoxy paint (Valspar Hi-Build Epoxy Curing Agent 89-T-1 and Base 89-W-9) for its anti-skate properties as well as to minimize any chemical interaction between the carbon steel platelets and the water-based natural latex and coagulant chemicals. No secondary coating for anti-adherence (decoupling) was applied, because it had already been noted that cured latex does not adhere to either the metal or the epoxy coating. After thorough curing of the epoxy, approximately 2500 platelets of ³⁄₃₂" diameter were formed by using a hammer and multiple ³⁄₃₂" pin punch on the metal against a backing of 0.035" thick high density polyethylene. These platelets were then gathered in a mound extending in a straight line.

A porcelain finger form was modified by placing a flexible magnetic strip (Magnasheet trademark) on the inner surface of the finger, and adhering it with its own self-adherent adhesive, and further smoothed and adhered by oversleeving it with a thin rubber finger cut from an examination glove.

The finger form was first dipped into a coagulant mixture of 20% calcium nitrate and water with talc suspended to act as a release agent. The finger form was inverted and allowed to haze over (about 12 minutes).

The finger form was then dipped into a thinned natural latex rubber suspension (40.8% solids), allowed to dwell for 10 seconds and then slowly removed. The form was inverted and allowed to gel (about 3 minutes).

The gelled finger form was then carefully brought close to the linear mound of prepared platelets, so that the platelets were attracted to the magnetic strip on the form. This was done until the platelets formed an even and thorough coating over the magnetic region on the inner surface of the finger. The finger form with adhered platelets was then slowly dipped into the thinned (40.8% solids) latex and allowed to dwell until all air bubbles that were trapped had escaped (approximately 15 seconds). The form was then slowly removed vertically and inverted to distribute latex evenly.

The latex was allowed to gel again (about 3 minutes) and the finger form received a final dip coating in the thinned latex, with slow immersion, 10 second dwell and slow removal with inversion. To ensure even distribution during curing, the form was mounted in a horizontal position and rotated at approximately 1 revolution per second while it was cured in a 195 degree Fahrenheit oven for 50 minutes. After curing, the form was removed from the oven, allowed to cool and lightly dusted with talcum powder, and the rubber composite was stripped from the form.

The resulting composite finger was very flexible and sensitive to feel. Its armored section measured approximately 0.035" thick and the latex rubber on the back and sides was approximately 0.013" thick. Dart drop testing at an energy of 200 gmf-cm was performed on the armored section of the finger 10 times with no resulting punctures.

EXAMPLE 5

Samples of ³⁄₃₂" diameter platelets were prepared using a hammer and multiple pin punch from full hard cold rolled 301 stainless steel foil of 0.002" thickness made by Teledyne Rodney Inc. of New Bedford, Mass. against a backing of high density polyethylene. The foil was washed with acetone to remove any oil left from the rolling process prior to punching the platelets. Four different types of platelet samples were then prepared:

1. cleaned platelets without any coating.
2. cleaned platelets dip coated from a 10.8% solution by weight in DMAC of 60D durometer polyurethane made by Thermedics, Inc., resulting in a thin layer (approximately 0.0005" thick) on each side.
3. cleaned platelets with a brush-on coating of a two part epoxy paint made by Valspar to a thickness of approximately 0.0005" on each side.
4. cleaned platelets with 0.002" thick PVC tape applied.

Each of the platelets were mounted on the adhesive side of a ¼" thick closed cell polyurethane foam used to simulate soft skin and placed in the dart drop tester (see FIG. 12) so that each platelet was under a compression hasp with a 0.180" diameter hole above it. A 10 gram weight was then dropped onto the top of a Becton Dickinson Micro-fine lancet which had been placed directly on the platelet to be tested. The drop height of the weight was varied until a median number of pass/fail results were obtained; i.e. when half of the tests either punctured or skated off the platelet, this median number in gramforce-centimeters was recorded.

In samples from the first group without any anti-skate coating, the median number for dart drop results was almost below the sensitivity of the test procedure, measuring about 50 gmf-cm. This low median number is a result of the needle skating readily off the platelet. In groups 2, 3, and 4, results were all markedly improved, approaching the results obtained with sheets of 0.002" thick 301 stainless steel foil of 400 gmf-cm (skating is not apparent in sheets, since the 0.180" diameter hasp hole limits the lateral travel of any lancet and gives a true puncture/no puncture median result). The median results for the 3/32" diameter platelets with the various anti-skate coatings were as follows:

| Group # | 1 | 2 | 3 | 4 |
|---|---|---|---|---|
| Median Dart Drop Result, gmf-cm | 50 | 300 | 350 | 350 |

EXAMPLE 6

Samples of 1/16", 3/32", and 1/8" diameter platelets were prepared using a hammer and multiple pin punch from full hard cold rolled 301 stainless steel foil of 0.002" thickness made by Teledyne Rodney Inc. of New Bedford, Mass. against a backing of high density polyethylene. The samples were treated before punching in the following manner: each was washed with acetone to remove any oil left from the rolling process, and 0.002" thick polyvinylchloride tape was applied to the top surface as an anti-skate coating. Each set of the three different diameter samples was then tested on the needle dart drop tester to determine the median impact required to cause a lancet needle to either puncture the platelet or skate off the surface of the platelet into the soft polyurethane foam backing beneath the platelet.

Each of the platelets was adhered to a 1/4" thick closed cell polyurethane foam to simulate soft skin and placed in the dart drop tester (see FIG. 12) so that each platelet was under a compression hasp with a 0.180" diameter hole above it. A 10 gram weight was then dropped onto the top of a Becton Dickinson Micro-fine lancet which had been placed directly on the platelet to be tested. The drop height of the weight was varied until a median number of pass/fail results were obtained, i.e. when half of the tests either punctured or skated off the platelet, this median number in gramforce-centimeters was recorded. The results showed a marked improvement in going from 1/16" to 3/31" diameter platelets with a further slight improvement in going to 1/8" diameter platelets.

| Disc Diameter | 1/16" | 3/32" | 1/8" |
|---|---|---|---|
| Median Dart Drop Results, gmf-cm | 100 | 350 | 400 |

Further modifications, alterations, variations, and adaptations of the present invention will occur to and/or be obvious to individuals skilled in the art in light of the foregoing detailed description of several preferred embodiments of this invention. The above description is intended to be illustrative only, and not to be limiting of the invention in its broader aspects. The invention should be understood as being limited only by the terms of the claims appended hereto.

What is claimed is:

1. A method of making a puncture and cut resistant composite material, said method comprising the steps of:

(1) providing a carrier sheet formed out of elastomeric material, said carrier sheet having a substantially planar top surface;

(2) mounting a donor sheet of material atop said carrier sheet, said donor sheet having substantially planar top and bottom surfaces, said donor sheet being mounted atop said carrier sheet so that the bottom surface of said donor sheet is disposed parallel and adjacent to the top surface of said carrier sheet; and (3) positioning said donor sheet and said carrier sheet in a reciprocating press having a plurality of punch members, said plurality of punch members being arranged in a selected pattern relative to one another, and each of said punch members having a working surface of a selected geometric shape, and operating said press so that said plurality of punch members are driven in their said selected pattern into engagement with said donor sheet so as to punch a plurality of flat platelets out of said donor sheet and embed them into said carrier sheet so as to form a composite sheet, said plurality of flat platelets each having an outer edge shape corresponding to said selected geometric shape of said punch members, and said plurality of flat platelets being disposed in said carrier sheet in a planar configuration having a pattern corresponding to said selected pattern of said punch members, said donor sheet being selected so that each of said flat platelets embedded in said carrier sheet is substantially impervious to puncturing or cutting by forces applied by hand-driven sharp objects, and said platelets being sized and disposed in said carrier sheet so as to render said composite sheet puncture and cut resistant, and so as to permit said composite sheet to flex.

2. A method according to claim 1 wherein two or more carrier sheets with affixed platelets are placed against one another in a laminar fashion and bonded together so as to form an overall composite material.

3. A method according to claim 2 wherein said two or more carrier sheets with affixed platelets are placed against one another so that their platelets are in offset relation relative to one another.

4. A method of forming a plurality of loose platelets each of which is substantially impervious to puncturing and/or cutting forces of the sort normally applied by hand-driven sharp objects, said method comprising the steps of:

(1) providing a carrier sheet formed out of a soft material, said carrier sheet having a substantially planar top surface;

(2) mounting a donor sheet of material atop said carrier sheet, said donor sheet having substantially planar top and bottom surfaces, said donor sheet being mounted atop said carrier sheet so that the bottom surface of said donor sheet is disposed parallel to and adjacent the top surface of said carrier sheet;

(3) positioning said donor sheet and said carrier sheet in a reciprocating press having a plurality of punch members, each of said punch members having a working surface of a selected geometric shape, and operating said press so that said plurality of punch members are driven into engagement with said donor sheet so as to punch a plurality of platelets out of said donor sheet and embed them into said carrier sheet so as to form a composite sheet, said plurality of platelets each having an outer edge shape corresponding to the said selected geometric shape of said punch members, said donor sheet being selected so that each of said platelets embedded in said carrier sheet is substantially rigid and substantially impervious to puncturing and/or cutting forces applied by hand-driven sharp objects; and (4) running said composite sheet over a roller so as to dislodge said platelets from said carrier sheet.

* * * * *